United States Patent
Raj (10) Patent No.: US 10,367,591 B2
(45) Date of Patent: Jul. 30, 2019

(54) OPTICAL DRIVER WITH ASYMMETRIC PRE-EMPHASIS

(71) Applicant: Xilinx, Inc., San Jose, CA (US)

(72) Inventor: Mayank Raj, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/862,058

(22) Filed: Jan. 4, 2018

(65) Prior Publication Data

US 2019/0207687 A1 Jul. 4, 2019

(51) Int. Cl.
*H04B 17/18* (2015.01)
*H04B 10/516* (2013.01)

(52) U.S. Cl.
CPC ........... *H04B 17/18* (2015.01); *H04B 10/516* (2013.01)

(58) Field of Classification Search
CPC ...... H04B 10/801; H04B 10/60; H04B 17/18; H04B 10/516
USPC ........................................................ 398/182
See application file for complete search history.

(56) References Cited

U.S. PATENT DOCUMENTS

| 8,452,582 | B1* | 5/2013 | Al-Hawari | G06F 17/5036 703/13 |
| 9,960,844 | B1* | 5/2018 | Raj | G01R 31/2635 |
| 2002/0086649 | A1* | 7/2002 | Vathulya | H03F 1/301 455/116 |
| 2007/0058976 | A1* | 3/2007 | Tatum | G02B 6/4201 398/99 |
| 2013/0188965 | A1* | 7/2013 | Afriat | H04B 10/60 398/136 |
| 2016/0372888 | A1* | 12/2016 | Tan | H01S 5/0427 |
| 2017/0031384 | A1* | 2/2017 | Bucelot | G06F 1/10 |

OTHER PUBLICATIONS

Ohhata et al; Design of 4X10 Gb/s VCSEL driver using asymmetric emphasis technique in 90nm CMOS for optical interconnection; May 2010; IEEE; pp. 1107-1115. (Year: 2010).*
Ohhata et al; Design of a 4X 10 Gb/s VCSEL Driver using Asymmetric Emphasis Technique in 90-nm CMOS for Optical Interconnection; May 2010; IEEE; pp. 1107-1115. (Year: 2010).*

(Continued)

*Primary Examiner* — Amritbir K Sandhu
(74) *Attorney, Agent, or Firm* — William L. Paradice, III (57) ABSTRACT

An optical driver is disclosed, including a PMOS pull-up circuit, an NMOS pull-down circuit, and an inductive circuit. The PMOS pull-up circuit may include a first terminal to receive a first input signal based on a received data signal, and a P output terminal coupled to the inductive circuit. The NMOS pull-down circuit may include a second input terminal to receive a second input signal based on the received data signal, and an N output terminal coupled to the inductive circuit. The inductive circuit may include an L output terminal to output an output signal, a P coil coupled between the P output terminal and the L output terminal, and an N coil coupled between the N output terminal and the L output terminal. The P coil may be configured to hide a parasitic capacitance associated with the PMOS pull-up circuit during a falling edge transition of the received data signal, and the N coil may be configured to hide a parasitic capacitance associated with the NMOS pull-down circuit during a rising edge transition of the received data signal.

20 Claims, 9 Drawing Sheets

(56) References Cited

OTHER PUBLICATIONS

Kozlov et al; Capacitively-Coupled CMOS VCSEL Driver circuits; Sep. 2016; IEEE; pp. 2077-2090. (Year: 2016).*
Kern et al; 18Gb/s Optical IO: VCSEL Driver and TIA in 90nm CMOS; 2007, Symposium on VLSI Circuits Digest of Technical Papers; pp. 276-277 (Year: 2007).*
Palermo, Samuel et al., "High-Speed Transmitters in 90nm CMOS for High-Density Optical Interconnects," Proc. of the 32nd European Solid-State Ciruits Conference, Sep. 19, 2006, pp. 508-511, IEEE, Piscataway, New Jersey, USA.

* cited by examiner

OPTICAL DRIVER WITH ASYMMETRIC PRE-EMPHASIS

TECHNICAL FIELD

Aspects of the present disclosure relate generally to optical communications, and specifically to optical driver circuits.

BACKGROUND

Fiber-optics allow information to be transmitted through an optical link (such as optical fiber) as pulses of light. The light forms an electromagnetic carrier wave that can be modulated to carry data, control signals, and other information. Optical links have significantly higher bandwidths and are less susceptible to electromagnetic interference than conventional electrical cabling (such as copper wires and Ethernet cables), and are often used to transmit data over relatively long distances. Optical transmitters may be used to convert electrical signals into optical signals suitable for transmission via optical links, and optical receivers may be used to convert optical signals into electrical signals suitable for transmission via conventional electrical cabling.

The conversion of electrical signals to optical signals may be performed using a variety of electro-optical converters including, for example, electro-absorption modulators (EAMs) and ring modulators (RMs). Because optical signals typically have a voltage swing (such as between logic low and logic high states) greater than supply voltages used by CMOS-based circuits, optical drivers may be used to increase the voltage swing of electrical signals prior to their conversion to optical signals. As data rates continue to increase, it becomes more difficult for optical drivers to sustain increasingly faster logic state transitions of electrical signals while also increasing their voltage swings to higher levels suitable for optical signals.

Further, non-linear distortion caused by power amplifiers and other circuits within electro-optical converters may cause the electro-optical converters to exhibit asymmetric responses to rising and falling edges of the electrical signals to be converted to optical signals. These asymmetric responses may cause the converted optical signals to have different rise and fall times associated with logic state changes in data signals, which is undesirable.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure are directed to optical driver circuits and methods of their operation. An example optical driver circuit may include an input terminal, an output terminal, a pull-up circuit, a pull-down circuit, and an inductive circuit. The input terminal may receive an input signal, and the output terminal may generate a level-shifted output signal, for example, by level-shifting the input signal. The pull-up circuit may include an input node responsive to the input signal, an output node inductively coupled to the output terminal, and may be configured to adjust rising edge transitions in the output signal based on a first control signal. The pull-down circuit may include an input node responsive to the input signal, an output node inductively coupled to the output terminal, and may be configured to adjust falling edge transitions in the output signal based on a second control signal. The inductive circuit may include a first inductor and a second inductor. The first inductor may be coupled between the output node of the pull-up circuit and the output terminal of the optical driver circuit, and the second inductor may be coupled between the output node of the pull-down circuit and the output terminal of the optical driver circuit.

In some embodiments, the first inductor may be configured to isolate parasitic capacitances in the pull-up circuit from the output terminal during falling edge transitions of the output signal, and the second inductor may be configured to isolate parasitic capacitances in the pull-down circuit from the output terminal during rising edge transitions of the output signal. In some aspects, the first and second control signals may be based on an asymmetric response of an associated electro-optical converter to rising and falling edge transitions of the output signal. In this manner, the optical driver circuit may provide a level of pre-emphasis in the output signal to compensate for the asymmetric response of the electro-optical converter.

An example method disclosed herein may be used to operate an optical driver circuit including at least an input terminal, an output terminal, a pull-up circuit, and pull-down circuit. The method may include receiving an input signal at the input terminal; level-shifting the input signal to generate an output signal at the output terminal; adjusting rising edge transitions of the output signal based on a first control signal; adjusting falling edge transitions of the output signal based on a second control signal; isolating parasitic capacitances in the pull-down circuit from the output terminal during the rising edge transitions of the output signal; and isolating parasitic capacitances in the pull-up circuit from the output terminal during falling edge transitions of the output signal. In some embodiments, the method may adjust the rising and falling edge transitions of the output signal independently of each other.

In some aspects, the method may also include determining an asymmetric response of an electro-optical converter to the rising and falling edge transitions of the output signal, and selecting values for the first and second control signals based on the determined asymmetric response. In this manner, the method may provide a level of pre-emphasis in the output signal to compensate for the asymmetric response of the electro-optical converter.

BRIEF DESCRIPTION OF THE DRAWINGS

The example embodiments are illustrated by way of example and are not intended to be limited by the figures of the accompanying drawings. Like numbers reference like elements throughout the drawings and specification.

DETAILED DESCRIPTION

Aspects of the present disclosure may improve the performance of an optical driver circuit by increasing the speed with which the optical driver circuit can facilitate rising edge transitions and falling edge transitions of an output signal to be provided to an electro-optical converter. In addition, or in the alternative, optical driver circuits disclosed herein may compensate for distortion caused by non-linear operating characteristics of an associated electro-optical converter by independently adjusting the rising edge transitions and/or the falling edge transitions of output signals provided to the associated electro-optical converter. In some embodiments, the optical driver circuit may include an inductive circuit that isolates parasitic capacitances from the output terminal of the optical driver circuit during rising and falling edge transitions of the output signal. More specifically, the inductive circuit may include a first inductor configured to isolate parasitic capacitances in a pull-up circuit from the output terminal during falling edge transitions of the output signal, and may include a second inductor configured to isolate parasitic capacitances in a pull-down circuit from the output terminal during rising edge transitions of the output signal. In this manner, the inductive circuit may reduce capacitive loading on the output terminal of the optical driver circuit, which in turn may increase the rising edge and falling edge transition speeds of the optical driver.

In some embodiments, the first and second inductors may be coupled in series with each other, the first inductor may be a first inductive coil formed in a first metal layer of a semiconductor device, and the second inductor may be a second inductive coil formed in a second metal layer of the semiconductor device. In some aspects, the first and second inductive coils may be of the same size and shape, and may be aligned relative to each other (such as by positioning the first inductive coil over the second inductive coil). In this manner, the inductive circuit may provide symmetry between the pull-up circuit and the pull-down circuit, for example, to ensure a balanced operation. In addition, the inductive circuit may provide an inductive coupling having a high self-resonant frequency between the pull-up circuit and the pull-down circuit, which in turn may minimize capacitive loading on the output terminal resulting from the first and second inductive coils.

The optical driver circuit may compensate for non-linearities in an associated electro-optical converter by allowing for asymmetric control of the rising and falling edge transitions of the output signal. In some embodiments, the optical driver circuit may provide asymmetric control of edge transitions of the output signal by using independent control signals to control or adjust the rising edge transitions and the falling edge transitions of the output signal.

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature and/or details are set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

Figure 1:
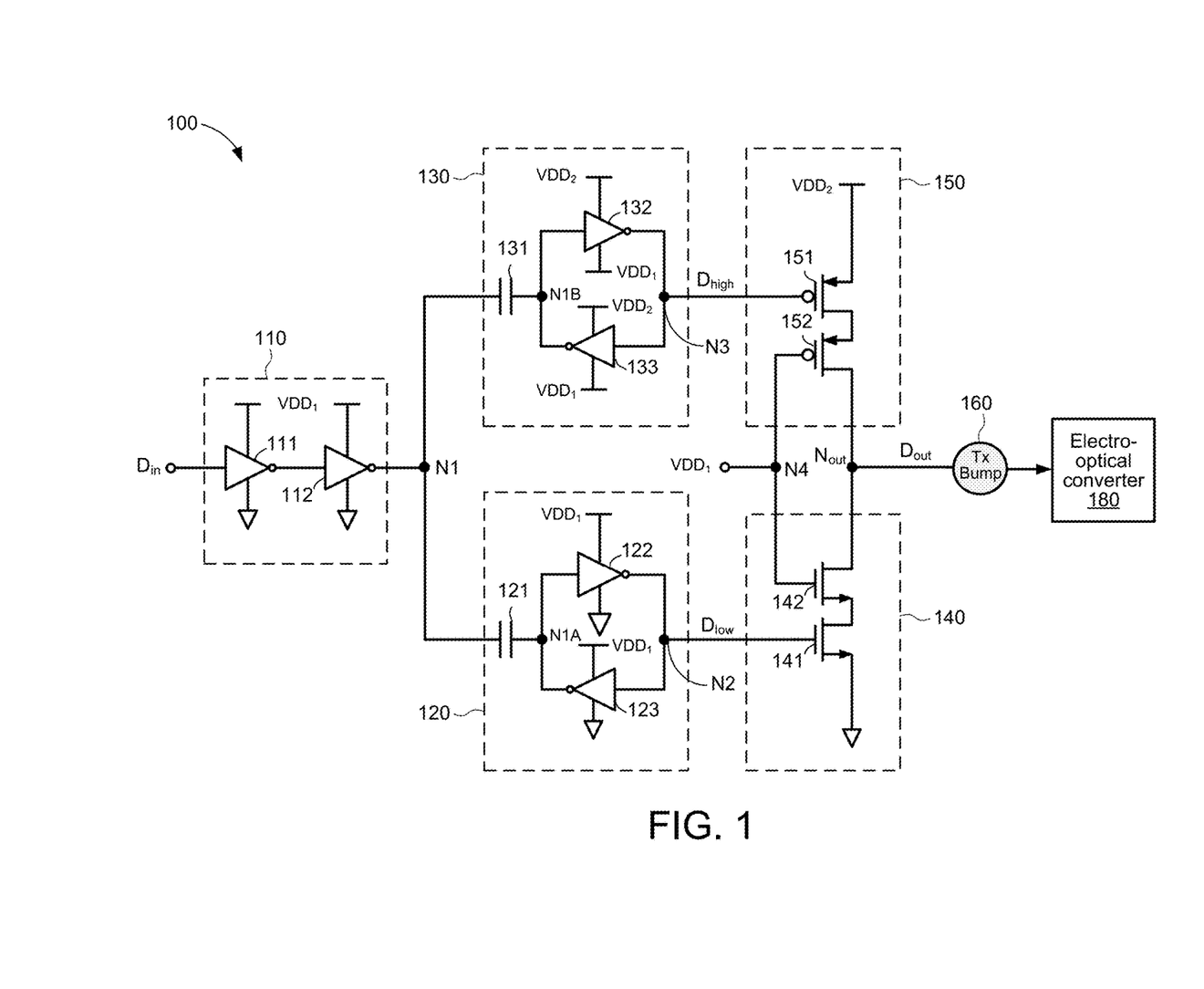
FIG. 1 is a block diagram of an optical driver circuit.

FIG. 1 is a block diagram of an optical driver circuit 100. The optical driver circuit 100 is depicted as receiving an input signal ($D_{in}$) having a relatively low voltage swing and generating an output signal ($D_{out}$) having a relatively high voltage swing. For purposes of discussion herein, the input signal $D_{in}$ may have a relatively low voltage swing between a first supply voltage $VDD_1$ and ground potential, and the output signal $D_{out}$ may have a relatively high voltage swing between a second supply voltage $VDD_2$ and ground potential, where the second supply voltage $VDD_2$ is greater than the first supply voltage $VDD_1$. In some aspects, the first supply voltage $VDD_1$ may be equal to approximately 0.9 volts, and the second supply voltage $VDD_2$ may be equal to approximately 1.8 volts. In other aspects, the first and second supply voltages $VDD_1$ and $VDD_2$ may be of other suitable voltages.

The optical driver circuit 100 is shown to include a buffer circuit 110, a non-level shifting latch circuit 120, a level shifting latch circuit 130, an NMOS pull-down circuit 140, and a PMOS pull-up circuit 150. In some aspects, the NMOS pull-down circuit 140 and the PMOS pull-up circuit 150 may form an output stage of the optical driver 100 that provides the output signal $D_{out}$ to a TX bump 160. The TX bump 160 may be coupled to an electro-optical converter 180 such as, for example, an EAM, an RM, or any other suitable electro-optical converter. The buffer circuit 110 includes an input terminal to receive the input signal $D_{in}$, and includes a first inverter 111 and a second inverter 112 coupled in series between the input terminal and a first node N1. The first and second inverters 111-112 include power terminals coupled to $VDD_1$ and ground potential, and may be used to drive (e.g., amplify) the input signal $D_{in}$ to have a rail-to-rail voltage swing between approximately 0 volts and $VDD_1$. In some aspects, the first and second inverters 111-112 may be CMOS inverters.

The output terminal of the buffer circuit 110 is coupled to an input terminal of the non-level shifting latch circuit 120 and to an input terminal of the level shifting latch circuit 130. The non-level shifting latch circuit 120 includes a capacitor 121, a pair of inverters 122-123, and an output terminal coupled to an input terminal of the NMOS pull-down circuit 140. The capacitor 121 may block DC components of the input signal $D_{in}$. The inverters 122-123, which include power terminals coupled to $VDD_1$ and ground potential, form an inverting latch that may store a logically complemented value of the input signal $D_{in}$. For example, if the input signal $D_{in}$ is driven to a logic high state (e.g., to $VDD_1$), the inverter 122 drives node N2 low to ground potential. In response to the logic low state of node N2, the inverter 123 drives node N1A high towards $VDD_1$, thereby maintaining node N1A in the logic high state. Conversely, if the input signal $D_{in}$ is driven to a logic low state towards ground potential, the inverter 122 drives node N2 high towards $VDD_1$. In response to the logic high state of node N2, the inverter 123 drives node N1A low to towards ground potential, thereby maintaining node N1A in the logic low state. Note that the power terminals of the inverters 122-123 are coupled to $VDD_1$ and ground potential, and therefore the input signal $D_{in}$ may not be level-shifted by the inverters 122-123. The non-level shifting latch circuit 120 may provide a complemented input signal $D_{low}$ to the NMOS pull-down circuit 140.

The NMOS pull-down circuit 140 includes a first NMOS transistor 141 and a second NMOS transistor 142. The first NMOS transistor 141 includes a source coupled to ground potential, a gate coupled to node N2 to receive the complemented input signal $D_{low}$, and a drain coupled to a source of the second NMOS transistor 142. The second NMOS transistor 142 includes a gate coupled to a bias node N4, and a drain coupled to the output terminal $N_{out}$ of the optical driver circuit 100. The bias node N4 may be coupled to $VDD_1$.

The level shifting latch circuit 130 includes a capacitor 131, a pair of inverters 132-133, and an output terminal coupled to an input terminal of the PMOS pull-up circuit 150. The capacitor 131 may block DC components of the input signal $D_{in}$. The inverters 132-133, which include power terminals coupled to $VDD_2$ and $VDD_1$, form an inverting latch that may store a logically complemented value of the input signal $D_{in}$. Moreover, because the power terminals of the inverters 132-133 are coupled to $VDD_2$ and $VDD_1$ (e.g., rather than to $VDD_1$ and ground potential, respectively), the level shifting latch circuit 130 may also level shift the input signal $D_{in}$ to generate a complemented level-shifted input signal $D_{high}$ having a voltage swing between approximately $VDD_2$ and $VDD_1$. For example, if the input signal $D_{in}$ is driven high towards $VDD_1$, the inverter 132 drives node N3 low towards $VDD_1$. In response thereto, the inverter 133 drives node N1B high towards $VDD_2$, thereby maintaining node N1B at or near $VDD_2$. Conversely, if the input signal $D_{in}$ is driven to a logic low state (e.g., to ground potential), the inverter 132 drives node N3 high towards $VDD_2$. In response thereto, the inverter 133 drives node N1B low to towards $VDD_1$, thereby maintaining node N1B at or near $VDD_1$. In this manner, the voltage swing of the input signal $D_{in}$ may be level shifted from a relatively low voltage range (between 0 volts and $VDD_1$) to a relatively high voltage range (between $VDD_1$ and $VDD_2$). The resulting complemented level-shifted input signal $D_{high}$ may be provided to the PMOS pull-up circuit 150 via node N3.

The PMOS pull-up circuit 150 includes a first PMOS transistor 151 and a second PMOS transistor 152. The first PMOS transistor 151 includes a source coupled to $VDD_2$, a gate coupled to node N3 to receive the complemented level-shifted input signal $D_{high}$, and a drain coupled to a source of the second PMOS transistor 152. The second PMOS transistor 152 includes a gate coupled to the bias node N4, and a drain coupled to the output terminal $N_{out}$ of the optical driver 100.

An example operation of the optical driver circuit 100 is described below assuming, for purposes of discussion, that $VDD_1$=0.9 volts and $VDD_2$=1.8 volts. When the input signal $D_{in}$ is in a logic high state (e.g., at or near $VDD_1$=0.9 volts), the non-level shifting latch circuit 120 drives the complemented non-level-shifted input signal $D_{low}$ low towards ground potential, which maintains the NMOS transistor 141 in a non-conductive state, for example, thereby isolating the output terminal $N_{out}$ from ground potential.

The logic high state of the input signal $D_{in}$ causes the level shifting latch circuit 130 to drive the complemented level-shifted input signal $D_{high}$ low towards $VDD_1$=0.9 volts, which turns on PMOS transistor 151. More specifically, because the source of PMOS transistor 151 is tied to $VDD_2$=1.8 volts, driving the gate of PMOS transistor 151 to $VDD_1$=0.9 volts causes PMOS transistor 151 to have a gate to source voltage ($v_{gs}$)=−0.9 volts, which turns on PMOS transistor 151. The gate of PMOS transistor 152 is tied to $VDD_1$=0.9 volts, and therefore PMOS transistor 152 also turns on. As a result, PMOS transistors 151-152 are both conductive, and may pull the output terminal $N_{out}$ high towards $VDD_2$=1.8 volts.

When the input signal $D_{in}$ is in a logic low state (e.g., at or near ground potential), the non-level shifting latch circuit 120 drives the complemented input signal $D_{low}$ high towards $VDD_1$=0.9 volts, which turns on NMOS transistor 141. The logic low state of the input signal $D_{in}$ causes the level shifting latch circuit 130 to drive the complemented level-shifted input signal $D_{high}$ high towards $VDD_2$=1.8 volts, which turns off PMOS transistor 151. More specifically, because the source of PMOS transistor 151 is tied to $VDD_2$=1.8 volts, driving the gate of PMOS transistor 151 to $VDD_2$=1.8 volts maintains PMOS transistor 151 in a non-conductive state, for example, thereby isolating the output terminal $N_{out}$ from $VDD_2$. The gate of NMOS transistor 152 is tied to $VDD_1$=0.9 volts, and therefore NMOS transistor 142 turns on. As a result, NMOS transistors 141-142 are both conductive, and may pull the output terminal $N_{out}$ low towards ground potential.

As described above, the optical driver circuit 100 may increase the voltage swing of electrical signals to levels more suitable for optical signals. More specifically, while the input signal $D_{in}$ has a voltage swing between approximately 0 volts and 0.9 volts, the output signal $D_{out}$ generated by the optical driver circuit 100 has a voltage swing between approximately 0 volts and 1.8 volts. However, as data rates increase, the optical driver circuit 100 of FIG. 1 may not be able to transition the output signal $D_{out}$ between ground potential and $VDD_2$ (such as between logic low and logic high states, respectively) fast enough, for example, because of the relatively large output load capacitance associated with the TX bump 160 (which in some implementations may be between 70-90 fF). The electro-optical converter 180 may also contribute to the load capacitance of the optical driver circuit 100, thereby exacerbating the inability of the optical driver circuit 100 to be used for increasingly higher data rates.

In addition, non-linear distortion resulting from one or more components of the electro-optical converter 180 may cause the electro-optical converter 180 to have asymmetric responses to rising and falling edges of the output signal $D_{out}$, which may undesirably cause the converted optical signals to have asymmetric rising and falling edges. Pre-distortion techniques employed by conventional optical driver circuits (such as the optical driver circuit 100) are typically linear, and therefore may not effectively compensate for non-linear distortion caused by the electro-optical converter 180.

In accordance with aspects of the present disclosure, optical driver circuits and methods of operation are disclosed that may achieve faster rising and falling edge transitions of output signals without any voltage swing degradation, for example, as compared with the optical driver circuit 100 of FIG. 1. In some aspects, the optical driver circuits disclosed herein may include an inductive circuit configured to reduce parasitic capacitances during edge transitions of the electrical output signal. The optical driver circuits disclosed herein may also compensate for non-linear distortion caused by the electro-optical converter 180, for example, by independently adjusting the rising and falling edge transitions of the output signals. In some aspects, a first control signal may selectively adjust the speed or duration of rising edge transitions of the output signal, and a second control signal may selectively adjust the speed or duration of falling edge transitions of the output signal. In this manner, the optical driver circuits disclosed herein may compensate for asymmetric responses of electro-optical converters to rising and rising edge transitions of output signals generated by the optical driver circuits.

Figure 2:
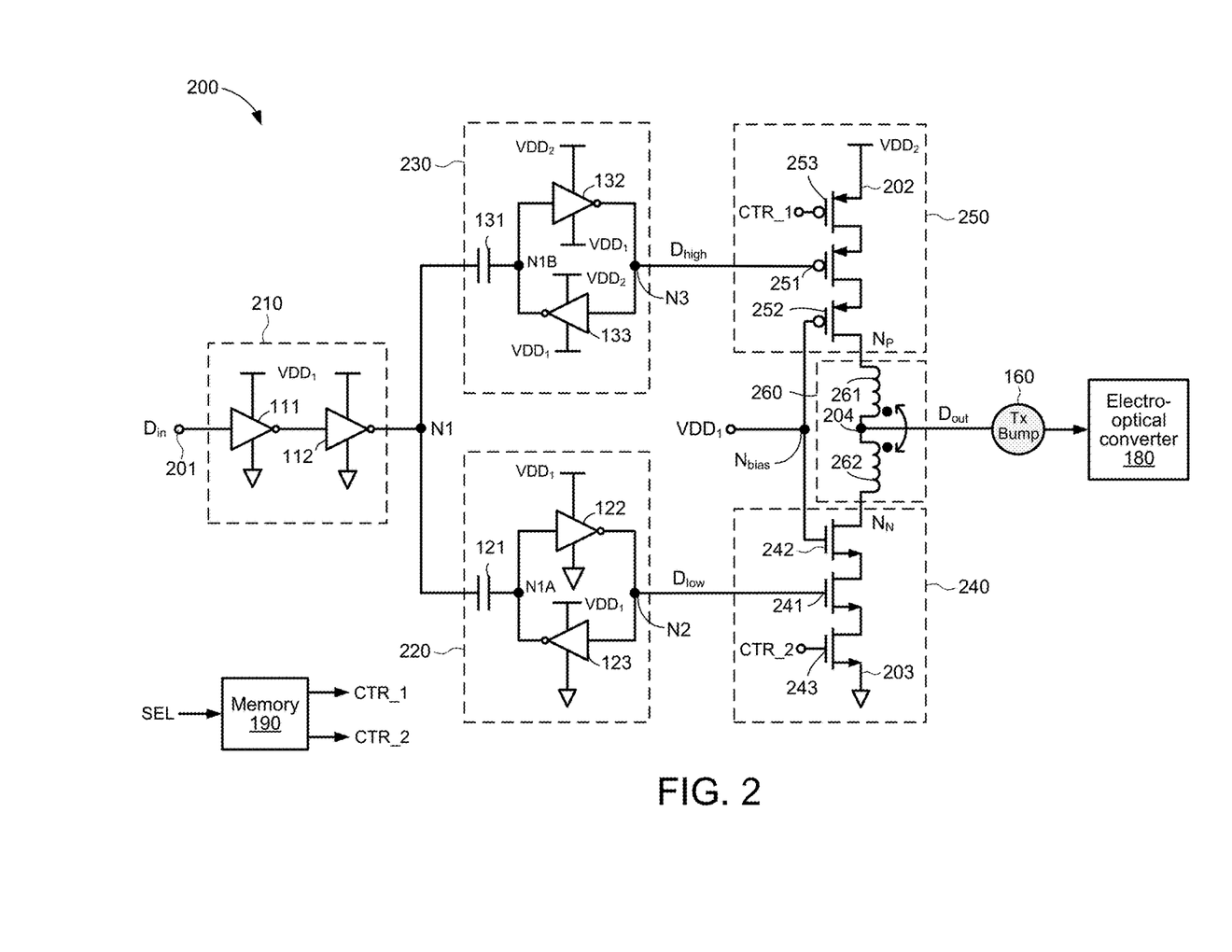
FIG. 2 is a block diagram of an example optical driver circuit, in accordance with some embodiments.

FIG. 2 shows an example optical driver circuit 200, in accordance with some embodiments. The optical driver circuit 200 is shown to include a buffer circuit 210, a non-level shifting latch circuit 220, a level shifting latch circuit 230, an NMOS pull-down circuit 240, a PMOS pull-up circuit 250, and an inductive circuit 260. In some embodiments, the buffer circuit 210 may be similar to the buffer circuit 110 of FIG. 1, the non-level shifting latch circuit 220 may be similar to the non-level shifting latch circuit 120 of FIG. 1, and the level shifting latch circuit 230 may be similar to the level shifting latch circuit 130 of FIG. 1. Thus, as described above with respect to FIG. 1, the input signal $D_{in}$ may be buffered (such as amplified) by the buffer circuit 210, and then provided to the non-level shifting latch circuit 220 and the level shifting latch circuit 230. The non-level shifting latch circuit 220 may generate a complemented input signal $D_{low}$ having a voltage swing between approximately $VDD_1$ and ground potential, and the level shifting latch circuit 230 may generate a complemented level-shifted input signal $D_{high}$ having a voltage swing between approximately $VDD_2$ and $VDD_1$. Thus, the logic states of the complemented non-level-shifted input signal $D_{low}$ and the complemented level-shifted input signal $D_{high}$ may be the logical complement of the logic state of the input signal $D_{in}$.

The complemented input signal $D_{low}$ may be provided to the NMOS pull-down circuit 240, and the complemented level-shifted input signal $D_{high}$ may be provided to the PMOS pull-up circuit 250. The PMOS pull-up circuit 250 may include a power node 202 coupled to $VDD_2$, may include an input node responsive to the input signal $D_{in}$, may include a control node responsive to a first control signal $CTR\_1$, and may include an output node $N_P$ inductively coupled to the output terminal 204 of the optical driver circuit 200. In some embodiments, the PMOS pull-up circuit 250 may be formed by PMOS transistors 251-253 coupled in series between the inductive circuit 260 and $VDD_2$. More specifically, the drain of PMOS transistor 252 is coupled to a second terminal of the inductive circuit 260 at node $N_P$, and the source of PMOS transistor 252 is coupled to the drain of PMOS transistor 251. The source of PMOS transistor 251 is coupled to the drain of PMOS transistor 253, and the source of PMOS transistor 253 is coupled to $VDD_2$. The gate of PMOS transistor 251 is configured to receive the complemented level-shifted input signal $D_{high}$, the gate of PMOS transistor 252 is coupled to a bias node $N_{bias}$, and the gate of PMOS transistor 253 is configured to receive the first control signal $CTR\_1$.

The NMOS pull-down circuit 240 may include a power node 203 coupled to ground potential, may include an input node responsive to the input signal $D_{in}$, may include a control node responsive to a second control signal $CTR\_2$, and may include an output node $N_N$ inductively coupled to the output terminal 204 of the optical driver circuit 200. In some embodiments, the NMOS pull-down circuit 240 may be formed by NMOS transistors 241-243 coupled in series between the inductive circuit 260 and ground potential. More specifically, the drain of NMOS transistor 242 is coupled to a first terminal of the inductive circuit 260 at a node $N_N$, and the source of NMOS transistor 242 is coupled to the drain of NMOS transistor 241. The source of NMOS transistor 241 is coupled to the drain of NMOS transistor 243, and the source of NMOS transistor 243 is coupled to ground potential. The gate of NMOS transistor 241 is configured to receive the complemented input signal $D_{low}$, the gate of NMOS transistor 242 is coupled to the bias node $N_{bias}$, and the gate of NMOS transistor 243 is configured to receive the second control signal $CTR\_2$. In some embodiments, the bias node $N_{bias}$ may be coupled to $VDD_1$, for example, as depicted in the example of FIG. 2.

In accordance with aspects of the present disclosure, the first control signal $CTR\_1$ may be used to control or adjust rising edge transitions of the output signal $D_{out}$, and the second control signal $CTR\_2$ may be used to control or adjust falling edge transitions of the output signal $D_{out}$. More specifically, the PMOS pull-up circuit 250 may be configured to adjust rising edge transitions of the output signal $D_{out}$ based on the first control signal $CTR\_1$, and the NMOS pull-down circuit 240 may be configured to adjust falling edge transitions of the output signal $D_{out}$ based on the second control signal $CTR\_2$. In some aspects, the PMOS pull-up circuit 250 and the NMOS pull-down circuit 240 may control or adjust rising edge transitions of the output signal $D_{out}$ and falling edge transitions of the output signal $D_{out}$, respectively, independently of each other.

In some embodiments, the first and second control signals $CTR\_1$ and $CTR\_2$ may be based at least in part on information indicating the asymmetric responses of the electro-optical converter 180 to rising and falling edge transitions of the output signal $D_{out}$. In this manner, the speed of rising edge transitions of the output signal $D_{out}$ and/or the speed of falling edge transitions of the output signal $D_{out}$ may be adjusted by the first and second control signals $CTR\_1$ and $CTR\_2$, respectively, to provide pre-emphasis in the output signal $D_{out}$ to compensate for non-linearities inherent in the electro-optical converter 180.

More specifically, the first control signal $CTR\_1$ may independently control or adjust the speed with which the PMOS pull-up circuit 250 pulls the output terminal 204 high towards $VDD_2$ during rising edge transitions of the output signal $D_{out}$ by selectively adjusting the gate voltage of PMOS transistor 253. For example, a voltage of the first control signal $CTR\_1$ may be decreased (such as to a less positive voltage) to increase current flow through PMOS transistor 253 and thereby increase the speed of rising edge transitions of the output signal $D_{out}$, and the voltage of the first control signal $CTR\_1$ may be increased (such as to a more positive voltage) to decrease current flow through PMOS transistor 253 and thereby decrease the speed of rising edge transitions of the output signal $D_{out}$. Similarly, the second control signal CTR_2 may independently control or adjust the speed with which the NMOS pull-up circuit 240 pulls the output terminal 204 low towards ground potential during falling edge transitions of the output signal $D_{out}$ by selectively adjusting the gate voltage of NMOS transistor 243. For example, a voltage of the second control signal CTR_2 may be increased (such as to a more positive voltage) to increase current flow through NMOS transistor 243 and thereby increase the speed of falling edge transitions of the output signal $D_{out}$, and the voltage of the second control signal CTR_2 may be decreased (such as to a less positive voltage) to decrease current flow through NMOS transistor 243 and thereby decrease the speed of falling edge transitions of the output signal $D_{out}$. In this manner, the optical driver circuit 200 may cause the rising and falling edge transitions of the output signal $D_{out}$ to exhibit an asymmetry that compensates for asymmetrical responses of the electro-optical converter 180.

The first and second control signals CTR_1 and CTR_2 may be generated by any suitable circuit provided within or coupled to the optical driver circuit 200. For the example depicted in FIG. 2, the optical driver circuit 200 is shown to include a memory 190 configured to provide or generate the first and second control signals CTR_1 and CTR_2. The memory 190 may be any suitable memory circuit or storage device (such as non-volatile memory) that can store voltage levels or values indicative of voltage levels for the first and second control signals CTR_1 and CTR_2. In some embodiments, the memory 190 may store a plurality of voltages or values for each of the first and second control signals CTR_1 and CTR_2. The voltages or values stored in the memory 190 for the first and second control signals CTR_1 and CTR_2 may be based on asymmetric response behavior of the electro-optical converter 180. In some aspects, the asymmetric response behavior of the electro-optical converter 180 may be determined using eye diagrams, for example, as described below with respect to FIG. 4B. In other aspects, the electro-optical converter 180 may provide a feedback signal (not shown for simplicity) indicating its asymmetric response to rising and falling edge transitions of the output signal $D_{out}$, and the feedback signal may be used to select and/or update voltages or values for each of the first and second control signals CTR_1 and CTR_2 stored in the memory 190.

The memory 190 may be programmed by a manufacturer of the optical driver circuit 200, by a tester of the optical driver circuit 200, by a user of the optical driver circuit 200, or any combination thereof. In some aspects, the memory 190 may be programmed with suitable values for the first and second control signals CTR_1 and CTR_2 in the field (such as by manual programming or by an over the air (OTA) update). In addition, or in the alternative, values stored in the memory 190 for the first and second control signals CTR_1 and CTR_2 may be dynamically updated in the field.

In some other embodiments, the memory 190 may be or include a look-up table (LUT) to store multiple voltages or values for each of the first and second control signals CTR_1 and CTR_2 that can be selected, for example, in response to a select signal (SEL). The select signal SEL may be based on, or may indicate, a desired edge transition setting that compensates for the asymmetric response of the electro-optical converter 180. In this manner, the optical driver circuit 200 may provide a level of pre-emphasis in the output signal $D_{out}$ to compensate for non-linearities in the electro-optical converter 180.

Parasitic capacitances within or associated with NMOS transistors 241-243 and PMOS transistors 251-253 may undesirably increase the capacitive load on the output terminal 204 of the optical driver circuit 200. For example, certain N-P junctions within NMOS transistor 242 (such as the N-P junction between the drain and body of NMOS transistor 242 and the N-P junction between the source and body of NMOS transistor 242) may form body diodes having parasitic capacitances. Similarly, certain P-N junctions within PMOS transistor 252 (such as the P-N junction between the drain and body of PMOS transistor 252 and the P-N junction between the source and body of PMOS transistor 252) may form body diodes having parasitic capacitances.

Figure 5A:
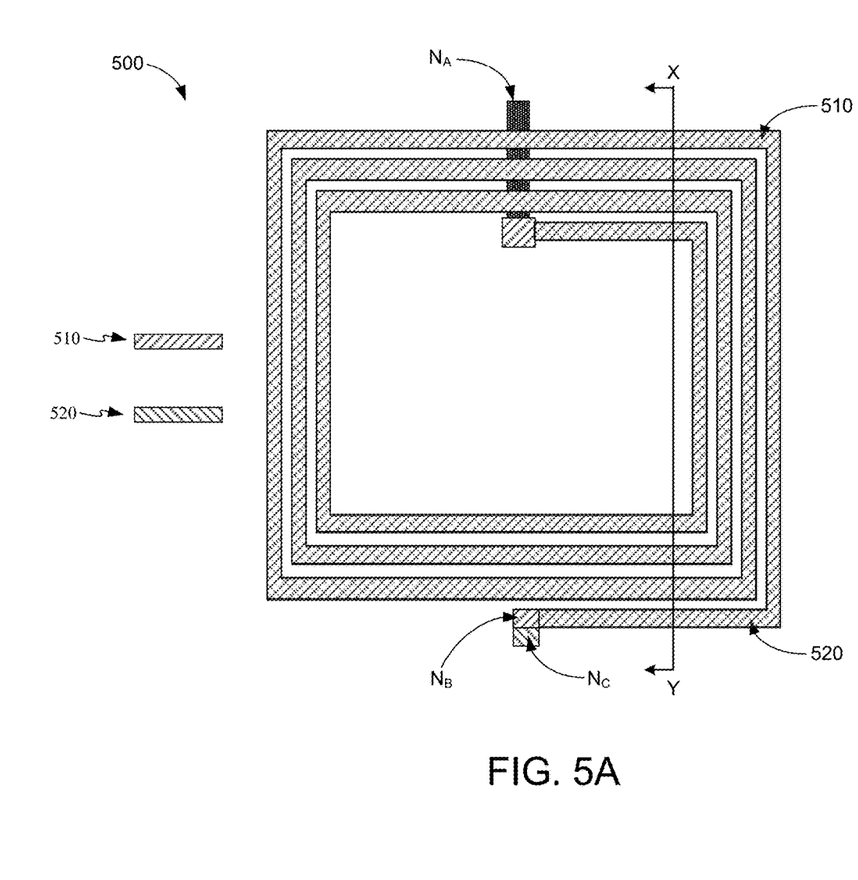
FIG. 5A shows a top plan view of an example inductive circuit that may be used in the optical driver circuit of FIG. 2, in accordance with some embodiments.

The inductive circuit 260 may include a first inductor 261 and a second inductor 262 connected in series between the PMOS pull-up circuit 250 and the NMOS pull-down circuit 240. As depicted in FIG. 2, the first inductor 261 is coupled between the source of PMOS transistor 252 and the output terminal 204, and the second inductor 262 is coupled between the drain of NMOS transistor 242 and the output terminal 204. In some implementations, the first and second inductors 261-262 may each be of the same size and shape, and may be stacked on top of each other, for example, as described in more detail below with respect to FIG. 5. In this manner, the first and second inductors 261-262 may be electromagnetically coupled to each other, thereby resulting in a mutual inductance between the first and second inductors 261-262 that may increase the overall inductance of the inductive circuit 260. In some aspects, the mutual inductance between the first and second inductors 261-262 may be based at least in part on a distance separating the first and second inductors 261-262.

In accordance with aspects of the present disclosure, the inductive circuit 260 may reduce or isolate parasitic capacitances within the NMOS pull-down circuit 240 and the PMOS pull-up circuit 250, thereby allowing for faster edge transitions in the output signal $D_{out}$ by reducing the overall load capacitance of the optical driver circuit 200 (such as compared to the optical driver circuit 100 of FIG. 1). More specifically, the first inductor 261 may reduce or isolate parasitic capacitances within the PMOS pull-up circuit 250 during rising edge transitions of the output signal $D_{out}$, and the second inductor 262 may reduce or isolate parasitic capacitances within the NMOS pull-down circuit 240 during falling edge transitions of the output signal $D_{out}$, for example, as described in more detail below with respect to FIGS. 3A-3B.

Figure 3A:
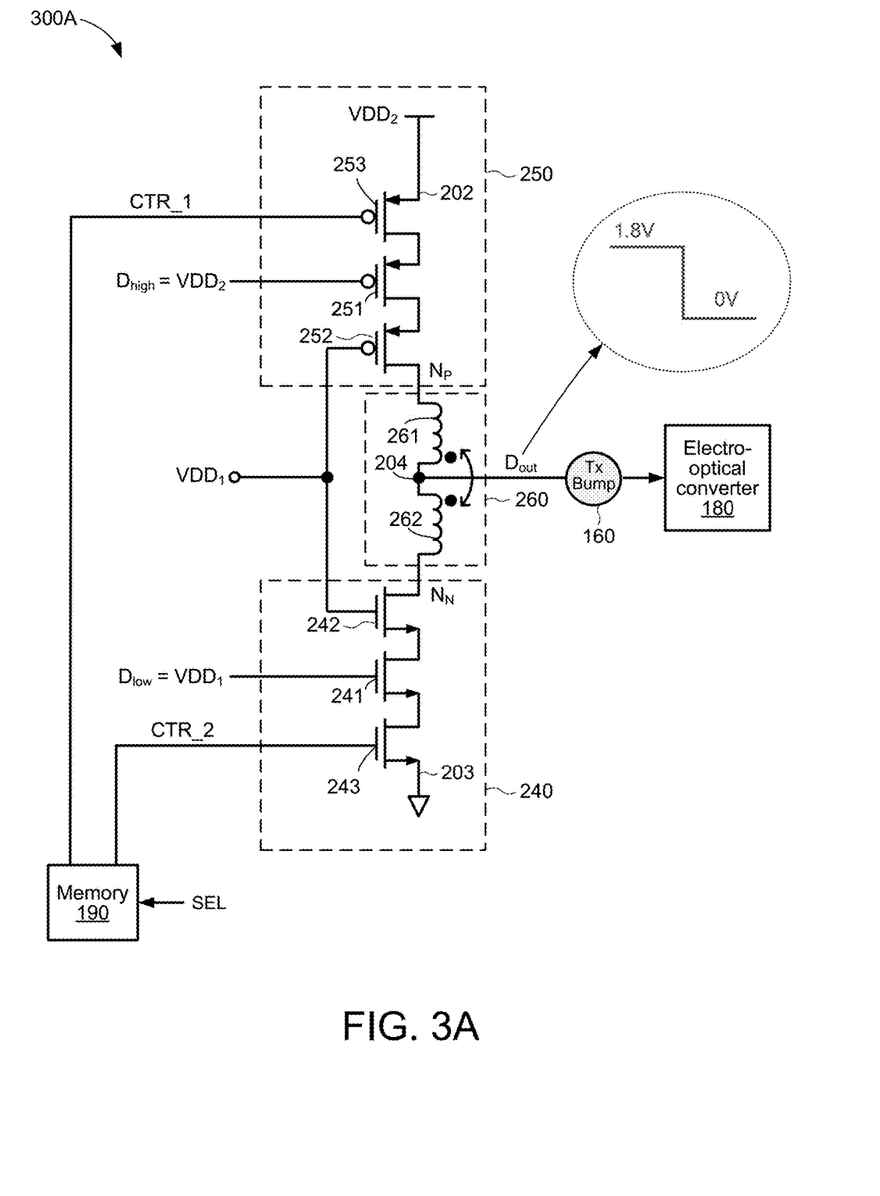
FIG. 3A is a block diagram depicting an example operation of the optical driver circuit of FIG. 2 associated with a falling edge transition of the output signal, in accordance with some embodiments.

FIG. 3A is a block diagram 300A depicting an example operation of the optical driver circuit 200 of FIG. 2 associated with a falling edge transition of the output signal $D_{out}$, in accordance with some embodiments. For the example of FIG. 3A, $VDD_1$=0.9 volts and $VDD_2$=1.8 volts (although other suitable supply voltages may be used for $VDD_1$ and $VDD_2$). Referring also to FIG. 2, when the input signal $D_{in}$ is in the logic high state, the non-level shifting latch circuit 220 pulls the complemented input signal $D_{low}$ low to approximately ground potential, and the level shifting latch circuit 230 pulls the complemented level-shifted input signal $D_{high}$ low to approximately 0.9 volts. The logic low state of $D_{low}$ turns off NMOS transistor 241, which may isolate the output terminal 204 from ground potential. The logic low state of $D_{high}$ turns on PMOS transistor 251, which may maintain the output terminal 204 in a logic high state at or near $VDD_2$=1.8 volts.

When the input signal $D_{in}$ transitions from the logic high state to the logic low state, the non-level shifting latch circuit 220 drives the complemented input signal $D_{low}$ high to approximately 0.9 volts, and the level shifting latch circuit 230 drives the complemented level-shifted input signal $D_{high}$ high to approximately 1.8 volts. As a result, the gate voltage of NMOS transistor 241 transitions from ground potential to approximately 0.9 volts and turns on NMOS transistor 241, and the gate voltage of PMOS transistor 251 transitions from approximately 0.9 volts to approximately 1.8 volts and turns off PMOS transistor 251. The conductive states of NMOS transistors 241-243 result in a current flowing from the TX bump 160 to ground potential, thereby pulling the output terminal 204 low towards ground potential through the NMOS pull-down circuit 240. More specifically, as the current flows from the output terminal 204 to ground potential via the first inductor 261 and the NMOS pull-down circuit 240, the output terminal 204 discharges from approximately 1.8 volts to approximately 0 volts, thereby resulting in a falling edge transition of the output signal $D_{out}$.

As current flows through the NMOS pull-down circuit 240 and discharges the output terminal 204, parasitic capacitances in PMOS transistor 251 may increasingly load the output terminal 204, which in turn may limit the speed of the falling edge transition of the output signal $D_{out}$. In accordance with aspects of the present disclosure, the first inductor 261 may effectively hide the parasitic capacitances of PMOS transistor 251 (as well as any parasitic capacitances associated with the other PMOS transistors 252 and 253) from the output terminal 204, for example, so that these parasitic capacitances do not affect the capacitive load on the output terminal 204.

More specifically, because the reactance of the first inductor 261 is frequency-dependent (such that the impedance of the first inductor 261 increases as the frequency increases), the higher frequency components of the current flowing from the TX bump 160 to ground potential may increase the impedance of the first inductor 261 such that the first inductor 261 effectively de-couples isolates parasitic capacitances associated with the PMOS pull-up circuit 250 from the output terminal 204. In this manner, the first inductor 261 may prevent these parasitic capacitances from affecting the overall load capacitance on the output terminal 204, thereby reducing the output load capacitance (as compared with the optical driver circuit 100 of FIG. 1).

Figure 3B:
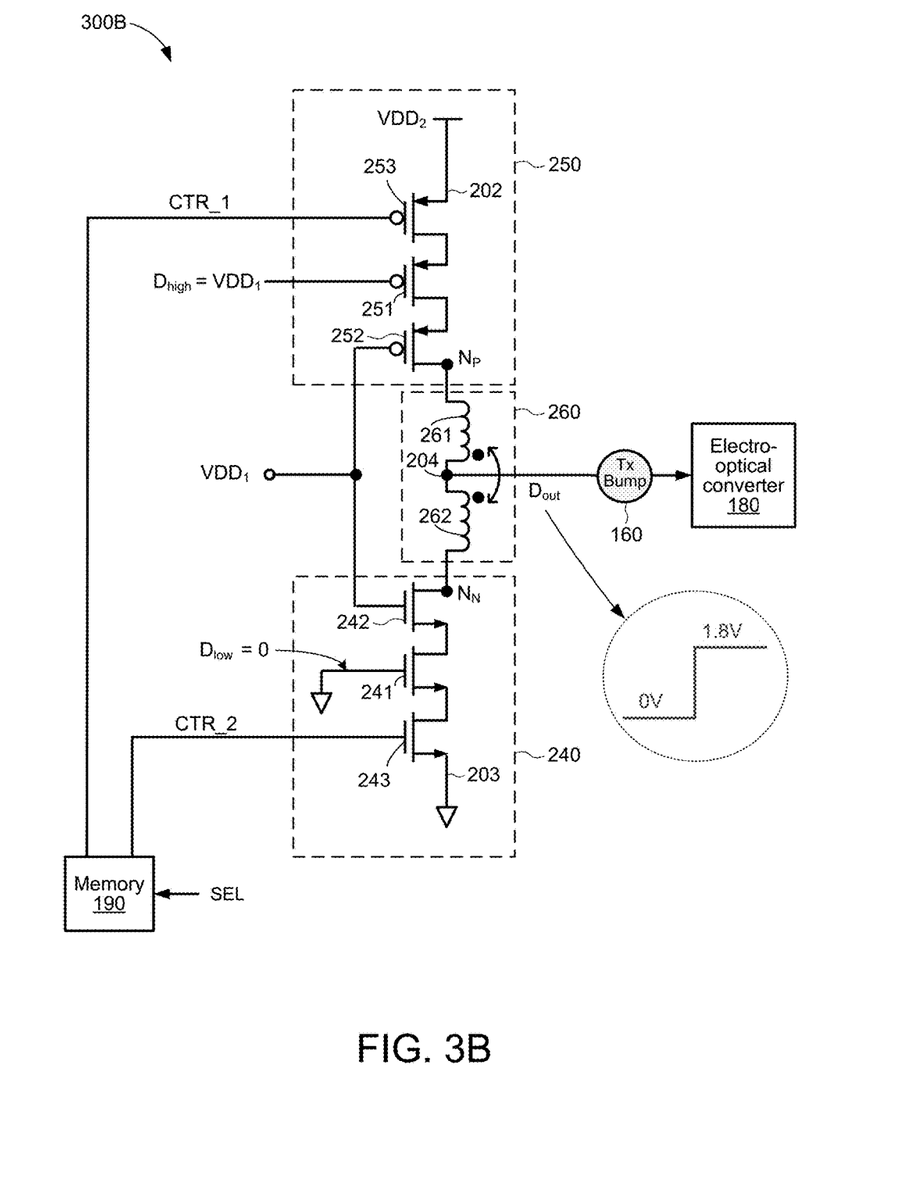
FIG. 3B is a block diagram depicting an example operation of the optical driver circuit of FIG. 2 associated with a rising edge transition of the output signal, in accordance with some embodiments.

FIG. 3B is a block diagram 300B depicting an example operation of the optical driver circuit of FIG. 2 associated with a rising edge transition of the output signal $D_{out}$, in accordance with some embodiments. For the example of FIG. 3B, $VDD_1$=0.9 volts and $VDD_2$=1.8 volts (although other suitable supply voltages may be used for $VDD_1$ and $VDD_2$). Referring also to FIG. 2, as the input signal $D_{in}$ transitions from the logic low state to the logic high state, the non-level shifting latch circuit 220 transitions the complemented input signal $D_{low}$ from approximately 0.9 volts to ground potential, and the level shifting latch circuit 230 transitions the complemented level-shifted input signal $D_{high}$ from approximately 1.8 volts to approximately 0.9 volts. As a result, the gate voltage of NMOS transistor 241 transitions from approximately 0.9 volts to ground potential and turns off NMOS transistor 241, and the gate voltage of PMOS transistor 251 transitions from approximately 1.8 volts to approximately 0.9 volts and turns on PMOS transistor 251. The conductive states of PMOS transistors 251-253 result in a current flowing from $VDD_2$ to the TX bump 160, thereby pulling the output terminal 204 high towards $VDD_2$ through the PMOS pull-up circuit 250. More specifically, as the current flows from $VDD_2$ to the output terminal 204 via the first inductor 261 and the PMOS pull-up circuit 250, the output terminal 204 is charged from 0 volts to approximately 1.8 volts, thereby resulting in a rising edge transition of the output signal $D_{out}$.

As current flows through the PMOS pull-up circuit 250 and charges the output terminal 204, parasitic capacitances in NMOS transistor 241 may increasingly load the output terminal 204, which in turn may limit the speed of the rising edge transition of the output signal $D_{out}$. In accordance with aspects of the present disclosure, the second inductor 262 may effectively isolate the parasitic capacitances of NMOS transistor 241 (as well as any parasitic capacitances associated with the other NMOS transistors 242 and 243) from the output terminal 204, for example, so that these parasitic capacitances do not affect the capacitive load on the output terminal 204.

More specifically, because the reactance of the second inductor 262 is frequency-dependent (such that the impedance of the second inductor 262 increases as the frequency increases), the higher frequency components of the current flowing from $VDD_2$ to the TX bump 160 may increase the impedance of the second inductor 262 such that the second inductor 262 effectively de-couples parasitic capacitances associated with the NMOS pull-down circuit 240 from the output terminal 204. In this manner, the second inductor 262 may prevent these parasitic capacitances from affecting the overall load capacitance on the output terminal 204, thereby reducing the output load capacitance (as compared with the optical driver circuit 100 of FIG. 1).

Moreover, the ability of the inductive circuit 260 to prevent parasitic capacitances from capacitively loading the output terminal 204 during edge transitions of the output signal $D_{out}$ may improve as operating frequencies increase and/or as the edge transitions of the output signal $D_{out}$ become sharper. For example, as the operating frequency of the optical driver circuit 200 increases, the impedances of the first and second inductors 261-262 also increase. As a result, the first inductor 261 may become even more effective in preventing parasitic capacitances associated with the PMOS pull-up circuit 250 from capacitively loading the output terminal 204, and the second inductor 262 may become even more effective in preventing parasitic capacitances associated with the NMOS pull-down circuit 240 from capacitively loading the output terminal 204.

Figure 4A:
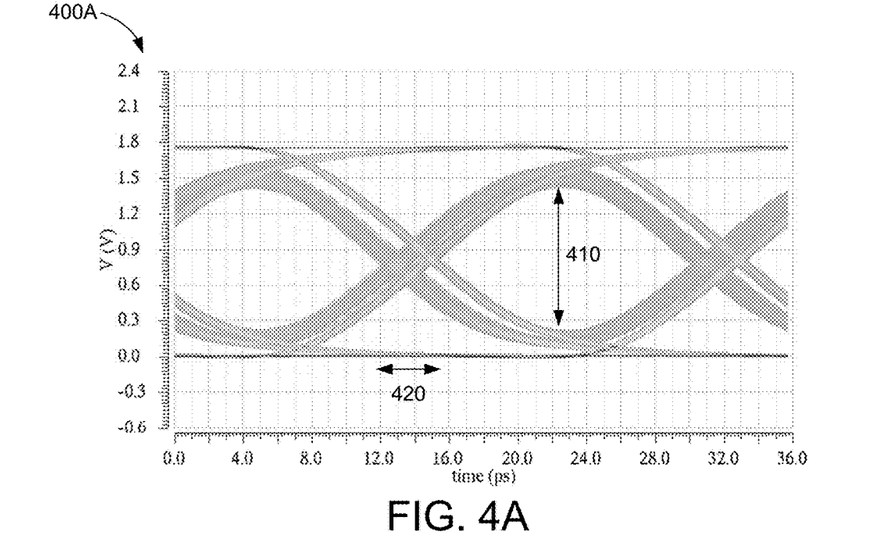
FIG. 4A shows an example eye diagram for the optical driver circuit of FIG. 1.

In some embodiments, the inductive circuit 260 may increase a vertical eye-opening and/or may reduce peak-to-peak jitter associated with the optical driver circuit 200, for example, as compared with the optical driver circuit 100 of FIG. 1. For example, FIG. 4A shows an example eye diagram 400A associated with the optical driver circuit 100 of FIG. 1 at a data rate of approximately 56 Gb/s. The optical driver circuit 100 exhibits a vertical eye-opening 410 of approximately 1.2 volts, and has a peak-to-peak jitter 420 of approximately 3.8 pico-seconds.

Figure 4B:
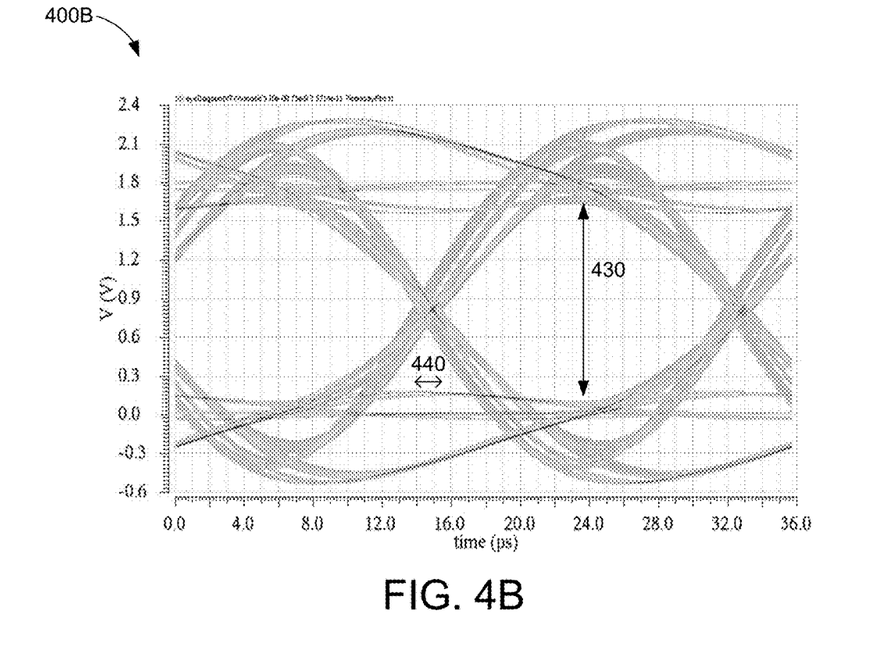
FIG. 4B shows an example eye diagram for the optical driver circuit of FIG. 2, in accordance with some embodiments.

FIG. 4B depicts an example eye diagram 400B associated with the optical driver circuit 200 of FIG. 2 at a data rate of approximately 56 Gb/s. The optical driver circuit 200 exhibits a vertical eye-opening 430 of approximately 1.55 volts, and has a peak-to-peak jitter 440 of approximately 1.2 pico-seconds. Thus, based on a comparison between the eye diagrams 400A and 400B, the optical driver circuit 200 has a vertical eye-opening 430 that is 1.55−1.2=0.35 volts greater than the vertical eye-opening 410 of the optical driver circuit 100 of FIG. 1, which represents an increase of approximately 30% over the optical driver circuit 100 of FIG. 1. Further, the optical driver circuit 200 has a peak-to-peak jitter 440 that is 3.8−1.2=2.6 pico-seconds less than the peak-to-peak jitter 420 of the optical driver circuit 100 of FIG. 1. In some aspects, information obtained from the example eye diagram 400B may be used to determine or measure the asymmetric response characteristics of the electro-optical converter 180.

The particular structure of the inductive circuit 260 of FIG. 2 may also improve performance of the optical driver circuit 200. In some embodiments, the first inductor 261 and the second inductor 262 may be identical structures formed in different metal layers of a semiconductor device (not shown for simplicity), and may be aligned or positioned on top of one another, for example, to increase the inductive coupling between the first and second inductors 261-262. Increasing the inductive coupling between the first and second inductors 261-262 may increase the overall inductance of the inductive circuit 260, which in turn increases the ability of the inductive circuit 260 to hide parasitic capacitances associated with the NMOS pull-down circuit 240 during rising edge transitions of the output signal $D_{out}$ and to hide parasitic capacitances associated with the PMOS pull-up circuit 250 during falling edge transitions of the output signal $D_{out}$. In addition, configuring the first and second inductors 261-262 to have identical shapes (and sizes) and to be aligned over each other may not only reduce circuit area but also may ensure symmetry between connections with the NMOS pull-down circuit 240 and the PMOS pull-up circuit 250, which in turn may ensure balanced operation between the NMOS pull-down circuit 240 and the PMOS pull-up circuit 250. The inductive circuit 260 may also provide an inductive coupling between the NMOS pull-down circuit 240 and the PMOS pull-up circuit 250. In some aspects, this inductive coupling may have a high self-resonant frequency that may reduce capacitive loading on the output terminal 204 resulting from the first and second inductors 261-262.

Figure 5B:
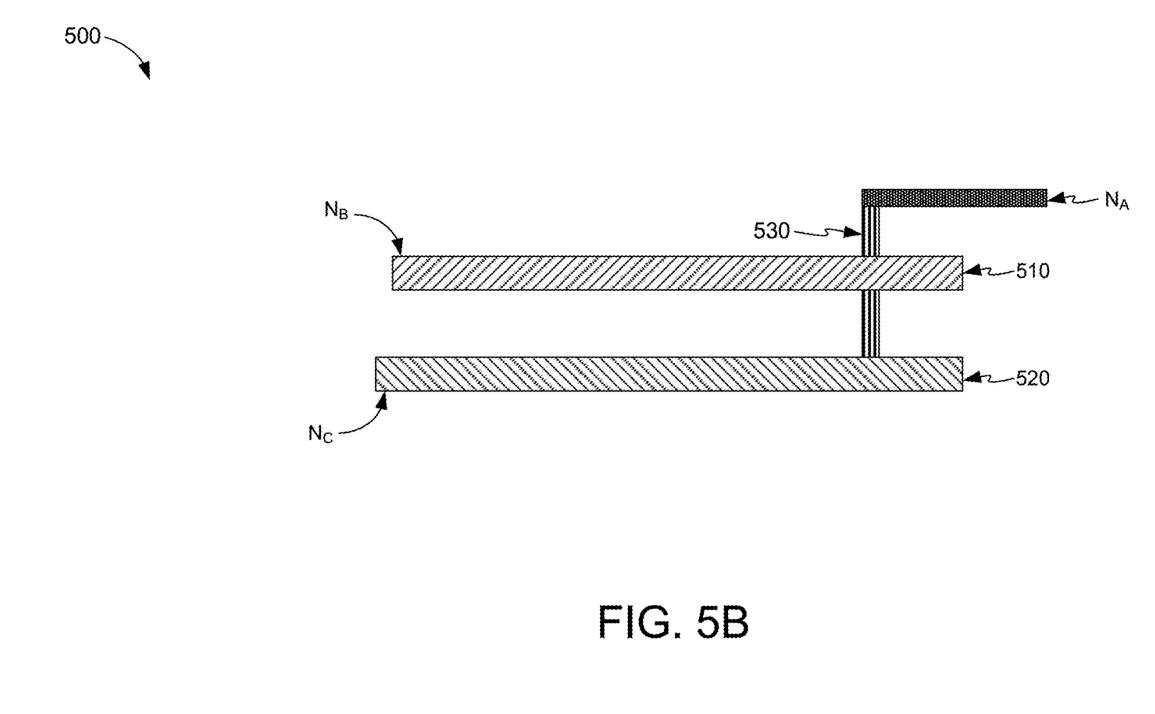
FIG. 5B shows a side plan view of the example inductive circuit of FIG. 5B.

FIG. 5A shows a top plan view of an example inductive circuit 500 in accordance with some embodiments, and FIG. 5B shows a side plan view of the example inductive circuit 500 along line XY of FIG. 5A. In some aspects, the inductive circuit 500 may be one embodiment of the inductive circuit 260 of FIG. 2. In other aspects, other suitable inductive circuits may be used as the inductive circuit 260 of FIG. 2. The inductive circuit 500 is shown to include a first inductive coil 510 and a second inductive coil 520. The first inductive coil 510 may be one embodiment of the first inductor 261 of FIG. 2, and second inductive coil 520 may be one embodiment of the second inductor 262 of FIG. 2. As depicted in FIG. 5, the first and second inductive coils 510-520 each have a rectangular shape of the same size, each include the same number of turns, and each include first ends coupled to a common node $N_A$ by a conductive via 530. The first inductive coil 510 includes a second end coupled to a node $N_B$, and the second inductive coil 520 includes a second end coupled to a node $N_C$. In some aspects, common node $N_A$ may correspond to the output terminal 204 of the optical driver circuit 200 of FIG. 2, node $N_B$ may correspond to the output node $N_N$ of the NMOS pull-down circuit 240 of FIG. 2, and node $N_C$ may correspond to the output node $N_P$ of the PMOS pull-up circuit 250 of FIG. 2.

In some embodiments, the first and second inductive coils 510 and 520 are formed in different metal layers and are aligned on top of each other, for example, as depicted in the top plan view of FIG. 5. Although the example inductive circuit 500 is depicted in FIG. 5 as having a rectangular shape, it is to be understood that the inductive circuit 500 may be of other suitable shapes, sizes, and configurations. For example, in other embodiments, the inductive circuit 500 may include inductive coils having a round, octagonal, or other suitable shape.

Simulations have shown that the inductive circuit 500 of FIG. 5 may have an effective inductance of 450 pH for both of the first and second inductive coils 510 and 520 with a coupling coefficient of 0.74, and may have a relatively high self-resonant frequency (SRF) of approximately 95 GHz. Because the operating frequencies of most optical transceivers are less than 95 GHz, the inductive circuit 500 may provide a negligible amount of capacitive loading on an associated optical driver circuit (such as the optical driver circuit 200 of FIG. 2).

Figure 6:
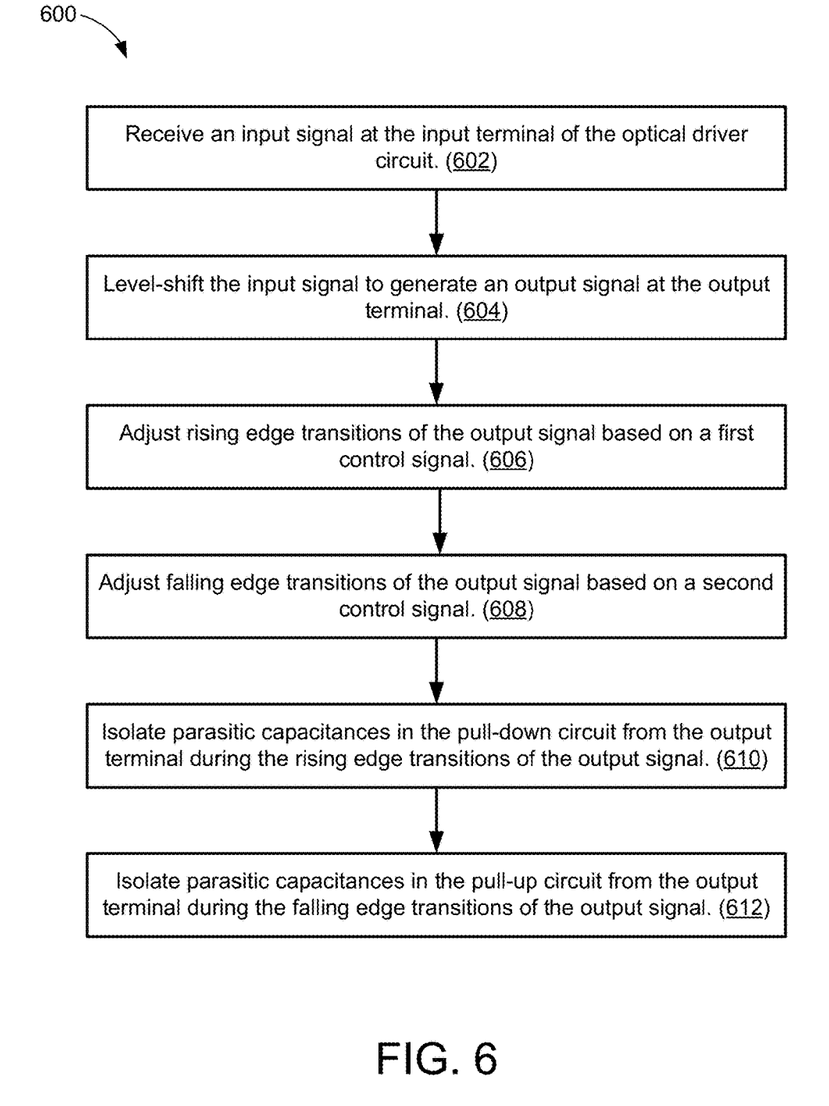
FIG. 6 is an illustrative flow chart depicting an example operation for selectively controlling edge transitions of an output signal of an optical driver circuit, in accordance with some embodiments.

FIG. 6 is an illustrative flowchart depicting an example operation 600 for operating an optical driver circuit, according to the example embodiments. Although described below with respect to the optical driver circuit 200 of FIG. 2, the example operation 600 may be performed by any suitable optical driver circuit. First, the optical driver circuit 200 may receive an input signal $D_{in}$ at the input terminal 201 (602). In some aspects, the input signal $D_{in}$ is buffered (such as amplified) by the buffer circuit 210, and then provided to the non-level shifting latch circuit 220 and the level shifting latch circuit 230.

The optical driver circuit 200 may level-shift the input signal to generate an output signal at its output terminal 204 (604). For example, the non-level shifting latch circuit 220 may generate a complemented input signal $D_{low}$ having a relatively low voltage swing between approximately ground potential and $VDD_1$, and the level shifting latch circuit 230 may generate a complemented level-shifted input signal $D_{high}$ having a relatively high voltage swing between approximately $VDD_1$ and $VDD_2$.

The optical driver circuit 200 may adjust rising edge transitions of the output signal based on a first control signal (606). In some embodiments, the PMOS pull-up circuit 250 may control or adjust the rising edge transitions of the output signal $D_{out}$ by selectively adjusting the gate voltage of PMOS transistor 251 based on the first control signal CTR_1. For example, a voltage of the first control signal CTR_1 may be decreased (such as to a less positive voltage) to increase current flow through PMOS transistor 253 and thereby increase the speed of rising edge transitions of the output signal $D_{out}$, and the voltage of the first control signal CTR_1 may be increased (such as to a more positive voltage) to decrease current flow through PMOS transistor 253 and thereby decrease the speed of rising edge transitions of the output signal $D_{out}$.

The optical driver circuit 200 may adjust falling edge transitions of the output signal based on a second control signal (608). In some embodiments, the NMOS pull-down circuit 240 may adjust the falling edge transitions of the output signal by selectively adjusting the gate voltage of NMOS transistor 241 based on the second control signal CTR_2. For example, a voltage of the second control signal CTR_2 may be increased (such as to a more positive voltage) to increase current flow through NMOS transistor 243 and thereby increase the speed of falling edge transitions of the output signal $D_{out}$, and the voltage of the second control signal CTR_2 may be decreased (such as to a less positive voltage) to decrease current flow through NMOS transistor 243 and thereby decrease the speed of falling edge transitions of the output signal $D_{out}$.

The optical driver circuit 200 may isolate parasitic capacitances in the pull-down circuit 240 from the output terminal 204 during the rising edge transitions of the output signal (610). In some embodiments, the second inductor 262 may isolate parasitic capacitances of NMOS transistor 241 (as well as any parasitic capacitances associated with the other NMOS transistors 242 and 243) from the output terminal 204, for example, so that these parasitic capacitances do not capacitively load the output terminal 204.

The optical driver circuit 200 may isolate parasitic capacitances in the pull-up circuit 250 from the output terminal during the falling edge transitions of the output signal 204 (612). In some embodiments, the first inductor 261 may isolate parasitic capacitances of PMOS transistor 251 (as well as any parasitic capacitances associated with the other PMOS transistors 252 and 253) from the output terminal 204, for example, so that these parasitic capacitances do not capacitively load the output terminal 204.

Figure 7:
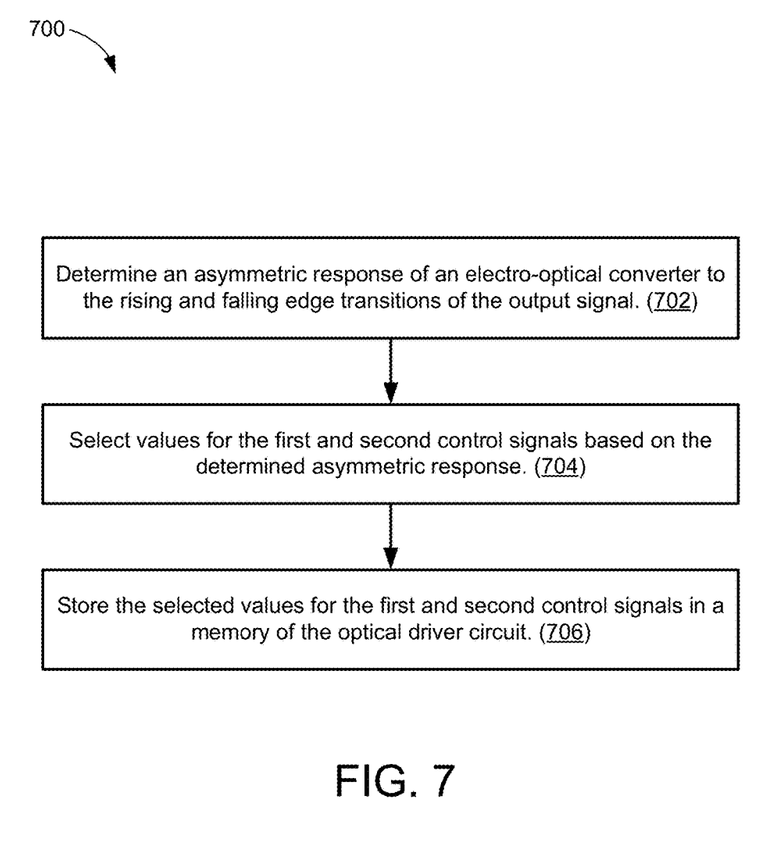
FIG. 7 is an illustrative flow chart depicting an example operation for selecting values for the first and second control signals associated with the optical driver circuit of FIG. 2, in accordance with some embodiments.

FIG. 7 is an illustrative flow chart depicting an example operation 700 for selecting values for the first and second control signals associated with the optical driver circuit 200 of FIG. 2, in accordance with some embodiments. Although described below with respect to the optical driver circuit 200 of FIG. 2, the example operation 700 may be performed by any suitable optical driver circuit.

The optical driver circuit 200 may determine an asymmetric response of an electro-optical converter 180 to the rising and falling edge transitions of the output signal (702). In some aspects, the asymmetric response of the electro-optical converter 180 may be determined using eye diagrams, for example, as described above with respect to FIG. 4B. In other aspects, the electro-optical converter 180 may provide a feedback signal (not shown for simplicity) indicating its asymmetric response to rising and falling edge transitions of the output signal $D_{out}$.

The optical driver 200 may select values for the first and second control signals CTR_1 and CTR_2 based on the determined asymmetric response (704). In some aspects, the selected values for the first and second control signals CTR_1 and CTR_2 may be configured to provide a level of pre-emphasis in the output signal $D_{out}$ to compensate for the asymmetric response of the electro-optical converter 180.

The optical driver circuit 200 may store the selected values for the first and second control signals CTR_1 and CTR_2 in a memory 190 of the optical driver circuit 200 (706). In some aspects, a selected value may be stored in the memory 190 for each of the first and second control signals CTR_1 and CTR_2. In other aspects, a plurality of selected values may be stored in the memory 190 for each of the first and second control signals CTR_1 and CTR_2.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM latch, flash latch, ROM latch, EPROM latch, EEPROM latch, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. An optical driver circuit, comprising:
an input terminal to receive an input signal;
an output terminal to generate a level-shifted output signal;
a pull-up circuit including an input node responsive to the input signal, further including an output node inductively coupled to the output terminal, and configured to adjust rising edge transitions in the level-shifted output signal based on a first control signal;
a pull-down circuit including an input node responsive to the input signal, including an output node inductively coupled to the output terminal, and configured to adjust falling edge transitions in the level-shifted signal based on a second control signal; and
an inductive circuit comprising:
a first inductor coupled between the output node of the pull-up circuit and the output terminal of the optical driver circuit; and
a second inductor coupled between the output node of the pull-down circuit and the output terminal of the optical driver circuit.

2. The optical driver circuit of claim 1, wherein the first and second control signals are based on an asymmetric response of an associated electro-optical converter to the rising edge transitions and the falling edge transitions of the level-shifted output signal.

3. The optical driver circuit of claim 1, further comprising:
a memory configured to store a number of values for each of the first and second control signals, wherein a speed of the rising edge transitions of the level-shifted output signal is based at least in part on a selected value of the first control signal, and a speed of the falling edge transitions of the level-shifted output signal is based at least in part on a selected value of the second control signal.

4. The optical driver circuit of claim 1, wherein the first inductor is configured to isolate parasitic capacitances in the pull-up circuit from the output terminal during the falling edge transitions of the level-shifted output signal, and the second inductor is configured to isolate parasitic capacitances in the pull-down circuit from the output terminal during the rising edge transitions of the level-shifted output signal.

5. The optical driver circuit of claim 1, wherein during the falling edge transitions of the level-shifted output signal, an impedance of the first inductor is increased based at least in part on higher-frequency components of the level-shifted output signal.

6. The optical driver circuit of claim 1, wherein during the rising edge transitions of the level-shifted output signal, an impedance of the second inductor is increased based at least in part on higher-frequency components of the level-shifted output signal.

7. The optical driver circuit of claim 1, wherein the first and second inductors are coupled in series with each other, the first inductor comprises a first inductive coil formed in a first metal layer of a semiconductor device, the second inductor comprises a second inductive coil formed in a second metal layer of the semiconductor device, and the first and second inductive coils are aligned with each other.

8. The optical driver circuit of claim 7, wherein first ends of the first and second inductive coils are coupled to the level-shifted output terminal by a via formed in the semiconductor device, and second ends of the first and second inductive coils are aligned with each other.

9. An optical driver circuit, comprising:
   an input terminal to receive an input signal;
   an output terminal to generate a level-shifted output signal;
   a pull-up circuit including a power node coupled to a supply voltage, an input node responsive to the input signal, a control node responsive to a first control signal, and an output node inductively coupled to the output terminal;
   a pull-down circuit including a power node coupled to ground potential, an input node responsive to the input signal, a control node responsive to a second control signal, and an output node inductively coupled to the output terminal; and
   an inductive circuit coupled to the output terminal, the inductive circuit configured to isolate parasitic capacitances in the pull-up circuit from the output terminal during falling edge transitions of the level-shifted output signal and to isolate parasitic capacitances in the pull-down circuit from the output terminal during rising edge transitions of the level-shifted output signal.

10. The optical driver circuit of claim 9, wherein the inductive circuit comprises:
   a first inductor coupled between the output node of the pull-up circuit and the output terminal of the optical driver circuit; and
   a second inductor coupled between the output node of the pull-down circuit and the output terminal of the optical driver circuit, wherein the first and second inductors are inductively coupled to each other.

11. The optical driver circuit of claim 10, wherein the first and second inductors are coupled in series with each other, the first inductor comprises a first inductive coil formed in a first metal layer of a semiconductor device, and the second inductor comprises a second inductive coil formed in a second metal layer of the semiconductor device.

12. The optical driver circuit of claim 11, wherein the first and second inductive coils are identical structures aligned on top of each other.

13. The optical driver circuit of claim 12, wherein first ends of the first and second inductive coils are coupled to the output terminal by a via formed in the semiconductor device, and second ends of the first and second inductive coils are aligned with each other.

14. The optical driver circuit of claim 9, wherein the pull-up circuit is configured to adjust the rising edge transitions of the level-shifted output signal based on the first control signal, and the pull-down circuit is configured to adjust the falling edge transitions of the level-shifted output signal based on the second control signal.

15. The optical driver circuit of claim 14, wherein the first and second control signals are based on an asymmetric response of an associated electro-optical converter to the rising and falling edge transitions of the level-shifted output signal.

16. A method for operating an optical driver circuit including at least an input terminal, an output terminal, a pull-up circuit, and pull-down circuit, the method comprising:
   receiving an input signal at the input terminal;
   level-shifting the input signal to generate an output signal at the output terminal;
   adjusting rising edge transitions of the output signal based on a first control signal;
   adjusting falling edge transitions of the output signal based on a second control signal;
   isolating parasitic capacitances in the pull-down circuit from the output terminal during the rising edge transitions of the output signal; and
   isolating parasitic capacitances in the pull-up circuit from the output terminal during the falling edge transitions of the output signal.

17. The method of claim 16, wherein the rising edge transitions and the falling edge transitions are adjusted independently of each other.

18. The method of claim 16, further comprising:
   configuring the first and second control signals to introduce asymmetry between the rising and falling edge transitions of the output signal.

19. The method of claim 16, further comprising:
   determining an asymmetric response of an electro-optical converter to the rising and falling edge transitions of the output signal; and
   selecting values for the first and second control signals based on the determined asymmetric response.

20. The method of claim 16, wherein the parasitic capacitances are isolated using an inductive circuit coupled to the output terminal.

* * * * *